(No Model.) 2 Sheets—Sheet 1.

I. FISHER.
DYNAMO ELECTRIC GENERATOR.

No. 280,301. Patented June 26, 1883.

Witnesses.
John F. C. Brunkert
Fred A. Powell

Inventor.
Israel Fisher
by Crosby & Gregory
attys.

(No Model.) 2 Sheets—Sheet 2.

I. FISHER.
DYNAMO ELECTRIC GENERATOR.

No. 280,301. Patented June 26, 1883.

Witnesses.
Fred A. Powell.
B. J. Noyes.

Inventor
Israel Fisher
by Crosby & Gregory
Attys.

N. PETERS, Photo-Lithographer, Washington, D. C.

UNITED STATES PATENT OFFICE.

ISRAEL FISHER, OF MEDFORD, ASSIGNOR TO THE NEW ENGLAND ELECTRIC MANUFACTURING COMPANY, OF BOSTON, MASSACHUSETTS.

DYNAMO-ELECTRIC GENERATOR.

SPECIFICATION forming part of Letters Patent No. 280,301, dated June 26, 1883.

Application filed August 11, 1882. (No model.)

*To all whom it may concern:*

Be it known that I, ISRAEL FISHER, of Medford, county of Middlesex, State of Massachusetts, have invented an Improvement in Electrical Generators, of which the following description, in connection with the accompanying drawings, is a specification.

My invention relates to an electrical generator; and it consists, mainly, in improvements in the construction and method of winding the armature, the core or iron portion of which is somewhat similar to the well-known Siemens armature.

My invention consists, partly, in the employment of two iron cores, each similar to that of the Siemens generator, set at right angles to one another upon the same axis or shaft, and thus forming a compound armature, with which the current produced in the coil upon one of the said cores will be of maximum strength when that in the coil upon the other core is of minimum strength, and the combined current thus produced from the two coils, when passing through one circuit, is continuous. For some purposes, however, the currents of the two coils will be led to separate circuits—one, for example, being employed to charge the field-magnet, while the other is used for other purposes—such, for example, as electroplating. In addition to the coils usually wound upon the core of the Siemens armature, I also provide the cylindrical poles of the said core with external wings to receive a coil wound longitudinally around the outside of the poles of the said armature, and thus lying between the iron core on the inside and the poles of the field-magnet on the outside. The coil of each armature may be provided with the usual commutator, and the currents from both the armatures either be caused to traverse a single circuit, in which case a continuous current will be produced, or they may be caused to traverse independent circuits, one of which may be confined to the coils of the field-magnets.

Figure 1:
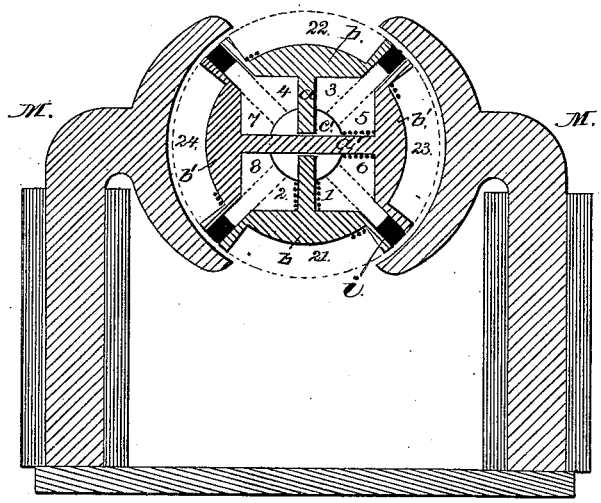
Figure 2:
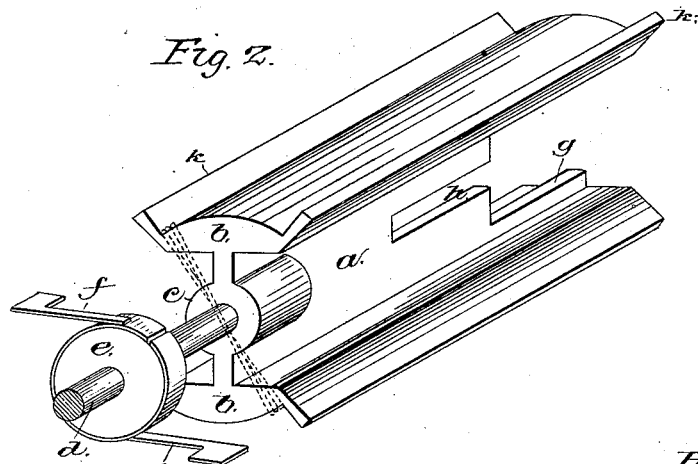
Figure 3:
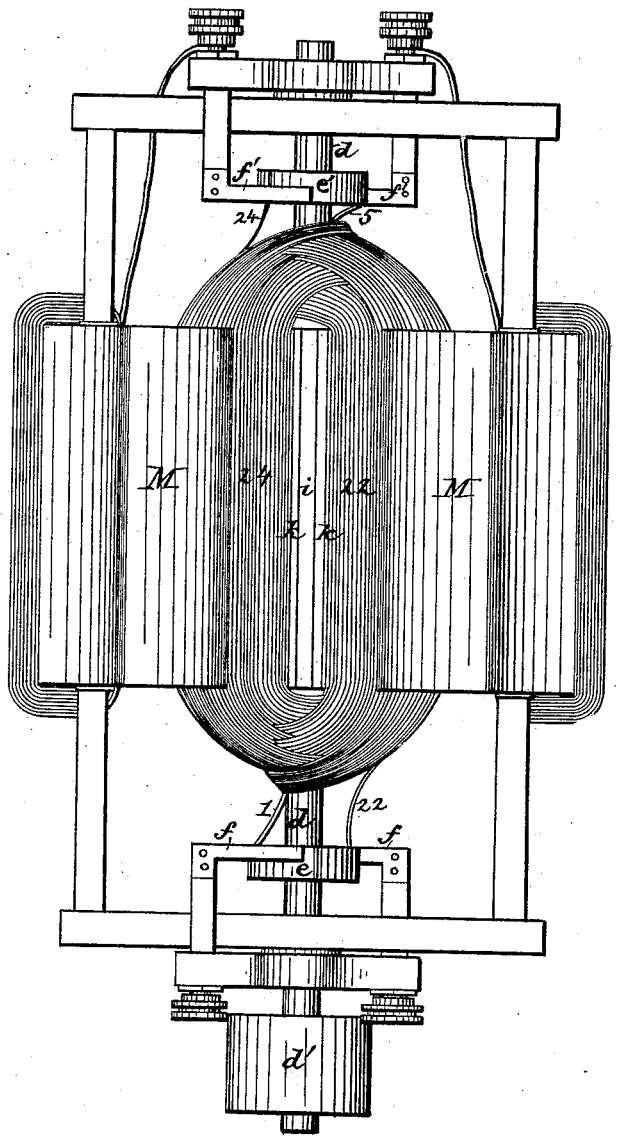

Figure 1 is a transverse section of a sufficient portion of an electric generator to illustrate this invention; Fig. 2, a perspective view of one of the iron cores forming one portion of the compound armature; and Fig. 3 is a plan view of the generator.

Each iron armature or core-piece, forming one-half the entire or compound armature of the machine, consists of the usual flat straight core, $a$, provided at its ends with the pole-pieces $b$, having a cylindrical external surface substantially like the well-known Siemens armature. The core $a$ is shown as provided at one side with a boss, $c$, to receive one end of the armature-shaft $d$, provided with the usual driving-pulley, $d'$, and with the commutators $e\ e'$, such as usually employed in Siemens machines to transmit the currents with uniform polarity to the external circuit, terminating in the contact-springs $f\ f'\ f'$. The other side of the core $a$ is provided with a large recess, $g$, to receive the boss $c'$, and a smaller recess or slot, $h$, to receive the core $a'$ of the other armature, $a'\ b'$, which is precisely similar to the one shown in Fig. 2, the said two armatures being interlocked with their cores $a\ a'$ at right angles to one another, as shown in Fig. 1, and being properly fastened together by pieces of non-magnetic material, either inserted between the edges of the poles, as shown at $i$, or by suitable pieces at the ends of the said portions of the armature. Each armature $a\ b$, $a'\ b'$ is provided with a coil, 1 2 3 4 and 5 6 7 8, wound around the respective cores $a$ and $a'$, between the poles $b\ b$ and $b'\ b'$ in the usual manner, except that each coil is so wound as to leave an equal space for the other, instead of occupying the entire space between the poles of its own armature.

The pole-pieces $b\ b$ and $b'\ b'$ are provided with wings $k$ along each edge, thus forming channels to receive additional coils 21 22 and 23 24, which are preferably wound, as indicated in Fig. 2, diagonally across at the ends of the armature; or, in other words, in winding around the poles $b\ b$, as shown in Fig. 2, the first coil begins at the left hand of the upper pole-piece $b$, and then crosses to the right hand of the lower pole-piece $b$, the successive convolutions being laid across the upper pole-piece from left to right and across the lower pole-piece from right to left, until the whole space is covered.

It is obvious that there may be various modifications in the connection of the coils without departing from this invention, which consists, mainly, in employing two independent coils, each forming an open circuit, having its terminals arranged to be connected with the terminals $f f$ or $f' f'$ of the external circuits, and each occupying a position substantially at right angles to the other relative to the axis of rotation of the armature, whereby currents are produced in each coil, of a nature similar to what is produced by the well-known Clark or Siemens machines—namely, discontinuous currents increasing from zero to a maximum of one polarity, then decreasing to zero and increasing to a maximum of the opposite polarity.

It is obvious that the external coils, 21 22 and 23 24, with the wings $k$, may be omitted, and the internal coils only employed, thus giving precisely the effect of two Siemens armatures, so arranged that the current of one is of maximum strength, while the current of the other is of minimum strength. If desired, the two external and two internal coils may each have an independent commutator connected with four or any less number of independent external circuits; or, as shown in Fig. 3, one external coil, as 21 22, may be connected in continuation of the internal coil, 1 2 3 4, on the same core, $a b$, the terminals 1 22 of the said connected coil being connected with one commutator, $e$, while the other external and internal coil will be similarly connected together and with the other commutator, $e'$, this being the arrangement usually adopted in practice.

The field-magnet M, having its coils connected with the springs $f' f'$ of one of the commutators, may be of any usual construction, as may also the frame-work sustaining it, and bearings for the shaft of the hereinbefore-described compound armature.

The portion $a$ is termed a "core," and the portion $b$ a "pole," when speaking in relation to the internal coils; but when speaking of the external coils the entire iron body $a b$ constitutes the core upon which the said external coils are wound.

A single Siemens armature having the coils wound upon the outside of its poles, as well as in the space between them, may sometimes be employed.

I claim—

1. In an electrical generator, the compound armature consisting of separate portions, each having a straight flat core, and poles at the end thereof, the said core of each portion being provided with a recess whereby the said portions are interlocked substantially at right angles to one another on a common axis, substantially as described.

2. In an electrical generator, the armature consisting of a core and poles at the ends thereof, substantially like Siemens armature, combined with wings at the sides of the said poles, and a coil of wire wound longitudinally around the said armature upon the outside of the said poles, between the said wings, substantially as described.

3. The compound armature consisting of two portions, each portion comprising a straight core, and poles at the ends thereof, and the said cores being recessed and interlocked, as described, combined with wings projecting outwardly at the sides of the said poles, and internal and external coils, substantially as described.

In testimony whereof I have signed my name to this specification in the presence of two subscribing witnesses.

ISRAEL FISHER.

Witnesses:
 JOS. P. LIVERMORE,
 B. J. NOYES.